(12) United States Patent
Rao

(10) Patent No.: US 8,190,160 B2
(45) Date of Patent: May 29, 2012

(54) METHOD FOR TRANSMITTING FAST SCHEDULING REQUEST MESSAGES IN SCHEDULED PACKET DATA SYSTEMS

(75) Inventor: Anil M Rao, Cedar Knolls, NJ (US)

(73) Assignee: Alcatel Lucent, Paris (FR)

( * ) Notice: Subject to any disclaimer, the term of this patent is extended or adjusted under 35 U.S.C. 154(b) by 87 days.

(21) Appl. No.: 12/814,613

(22) Filed: Jun. 14, 2010

(65) Prior Publication Data

US 2010/0260132 A1    Oct. 14, 2010

Related U.S. Application Data

(62) Division of application No. 11/507,875, filed on Aug. 22, 2006, now abandoned.

(51) Int. Cl.
*H04W 88/02* (2009.01)
(52) U.S. Cl. ...................................................... 455/436
(58) Field of Classification Search .................. 455/436
See application file for complete search history.

(56) References Cited

U.S. PATENT DOCUMENTS

| 6,031,832 | A | 2/2000 | Turina |
| 6,317,854 | B1* | 11/2001 | Watanabe ..................... 714/749 |
| 6,731,638 | B1* | 5/2004 | Ofek ........................... 370/395.4 |
| 7,142,548 | B2 | 11/2006 | Fong et al. |
| 2004/0223455 | A1 | 11/2004 | Fong et al. |
| 2005/0063330 | A1 | 3/2005 | Lee et al. |
| 2006/0039319 | A1 | 2/2006 | Lee et al. |
| 2008/0019310 | A1 | 1/2008 | Sebire et al. |
| 2009/0161688 | A1 | 6/2009 | Park et al. |
| 2009/0323625 | A1 | 12/2009 | Lee et al. |
| 2010/0271963 | A1* | 10/2010 | Koorapaty et al. .......... 370/252 |
| 2001/0288752 | * | 11/2011 | Muller ........................ 701/112 |

* cited by examiner

*Primary Examiner* — Diane Mizrahi
(74) *Attorney, Agent, or Firm* — M. I. Finston

(57) ABSTRACT

Disclosed is a method of allocating resources in a packet data system to a User Equipment (UE) with an active data session, such as a Voice over Internet Protocol (VoIP) call, using dedicated resources to transmit scheduling requests, thereby reducing latency which may occur as a result of collisions associated with transmitting scheduling requests over a random access channel. The method comprises the step of transmitting over dedicated resources a scheduling request, and receiving a scheduling grant in response thereto. The scheduling request indicates that a transmitter in a data session has a data packet to transmit. The scheduling grant indicates resources allocated for transmitting the data packet.

8 Claims, 3 Drawing Sheets

METHOD FOR TRANSMITTING FAST SCHEDULING REQUEST MESSAGES IN SCHEDULED PACKET DATA SYSTEMS

This is a divisional of patent application Ser. No. 11/507,875, filed Aug. 22, 2006 now abandoned.

FIELD OF THE INVENTION

The present invention relates generally to wireless communication systems and, in particular, to scheduled packet data system.

BACKGROUND OF THE RELATED ART

To increase system capacity, Universal Mobile Telecommunication System (UMTS) based wireless communication systems will evolve to a packet data system. All services, including voice services, will be supported by the packet data system. The packet data system will use an Orthogonal Frequency Division Multiple Access (OFDMA) air interface for transmitting data packets between Node Bs and User Equipments (UE). The OFDMA air interface comprises a set of orthogonal sub-carrier frequencies, i.e., resources, which are partitioned in terms of frequency and/or time into reverse link and forward link resources.

In the packet data system, the reverse link resources may be dedicated resources or shared resources. For purposes of this application, the term "dedicated resources" should be construed to mean resources which are dedicated to a particular UE for use for an entire data session, such as a Voice over Internet Protocol (VoIP) call, and the term "shared resources" should be construed to mean resources which are not dedicated resources, i.e., the resources may be used by multiple UEs during a data session.

Transmissions over the reverse link resources may be contention or non-contention based. When the transmission is contention based, multiple UEs may be simultaneously transmitting over a same reverse link resource. When the transmission is non-contention based, multiple UEs are not permitted to simultaneously transmit over a same reverse link resource. For non-contention based transmissions, a scheduler at the Node B is used to allocate the reverse link resources such that multiple UEs are not using a same reverse link resource at the same time. Unless otherwise stated, all transmissions described herein are non-contention based transmissions.

FIG. 1 depicts a chart 100 illustrating a method of allocating reverse link resources to a UE for a VoIP call in accordance with the prior art. At time t0, the UE is in an idle state when data arrives in its buffer. The data may include call setup information and/or data packets, such as VoIP call setup signaling messages and speech packets. At time t1, the UE transmits a selected preamble to a Node B over a non-synchronized Random Access CHannel (RACH), wherein the non-synchronized RACH is non-synchronized in the sense that it is not time synchronized with the Node B. The preamble indicates to the Node B that the UE needs resources in order to transmit its data. The preamble is randomly selected by the UE from a set of preambles, wherein each preamble is a unique signature sequence which have low cross correlation with each other. For example, the set of preambles includes Walsh codes or sequences which have low cross correlation with each other.

Note that preambles transmitted over the non-synchronized RACH are contention based transmissions. The low cross correlation characteristic of the preambles allows a Node B receiving two or more different preambles simultaneously over the non-synchronized RACH to distinguish one preamble from another. If two or more UEs transmit a same preamble simultaneously on the non-synchronized RACH, then a collision may occur. In such a situation, neither preamble may be successfully received by the Node B. The UEs would have to wait some predetermined or random time interval before re-transmitting the same or another preamble.

At time t2, the Node B detects the preamble and allocates shared resources to the UE for transmitting a scheduling request message (SRM). Note that when shared resources are allocated, such allocation of resources is usually for some fixed time duration or transmission time interval (TTI) which expires before the call ends. The SRM is a resource request indicating information about the data, among other things, such that reverse link resources may be properly allocated by the Node B for the transmission of the data. For example, the SRM may indicate information regarding an amount of data and data type.

At time t3, the Node B transmits to the UE an acknowledgement and a resource assignment message over an Acquisition Indicator CHannel (AICH) or other control channel. The acknowledgement indicates that the preamble was received and the identity of the preamble that was received (which can be used by the UE to determine the intended recipient of the acknowledgement). The resource assignment message indicates the shared resources allocated to the UE for sending the SRM.

At time t4, the UE receives the acknowledgement and resource assignment message. The UE selects a SRM from a set of SRMs. The set of SRMs include subsets of (one or more) SRMs, wherein each subset is associated with different categories of data. For example, one subset might be associated with 400 bits of speech, whereas another subset might be associated with 600 bits of video. Each SRM is a signature sequence having low cross correlation with other SRMs. The SRM (or subset) is selected based on which category the data matches.

At time t5, the UE transmits the selected SRM using the allocated shared resources indicated in the resource assignment message. At time t6, the Node B receives the SRM and allocates shared resources to the UE based on the category of the received SRM, wherein the allocated shared resources are sufficient for the transmission of the data. At time t7, the Node B transmits over a control channel, such as a grant channel, a scheduling grant indicating the allocated shared resources and the UE to which the shared resources are being allocated.

At time t8, the UE receives the scheduling grant which allows the UE to enter an active state in which the VoIP call (or data session) is activated. At time t9, the UE uses the allocated shared resources to transmit its data. At time t10, the Node B receives the data.

While the VoIP call (or data session) is active, the UE receives more data (e.g., speech packets) in its buffer at time t11. The UE selects another SRM and waits until a synchronized RACH is available, wherein the synchronized RACH is synchronized in the sense that it is time synchronized with the Node B. At time t12, the synchronized RACH becomes available and the UE transmits the SRM. The SRM is transmitted at some transmit power based on an interference level broadcasted by the Node B (for an associated cell or sector), a desired signal to interference ratio (SIR) at the Node B and a path loss estimated from a pilot signal transmitted by the Node B. If the power used to transmit the SRM is insufficient, the SRM may not be received properly by the Node B. In such a case, the UE would have to wait some random or predetermined time interval before transmitting another SRM.

Note that when the UE is in an active data session, it uses the synchronized RACH to transmit the SRM. The SRM transmissions over the synchronized RACH are contention based transmissions (unlike when the UE is in the idle state and using allocated shared resources to transmit the SRM, i.e., non-contention based transmission). If another UE transmits the same SRM simultaneously on the synchronized RACH, then a collision may occur and the UE would have to wait some random or predetermined time interval before transmitting another SRM.

The SRM is received by the Node B at time t13. Shared resources are allocated to the UE for transmission of its data based on the SRM. At time t14, the Node B transmits a scheduling grant over a control channel, such as a grant channel, indicating the allocated shared resources. The UE receives the scheduling grant at time t15 and transmits its data at time t16 using the allocated shared resources. At time t17, the Node B receives the data.

When the UE is in an active data session, there exists a latency period from when the UE receives data in its buffer at time t11 to when the UE transmits the data at time t16. The latency period is due, in large part, to delays associated with the UE waiting for the synchronized RACH to become available, collisions occurring on the synchronized RACH and/or insufficient initial transmit power for the SRM. Such delays may result in latency period being upwards of 50-60 ms. For time sensitive data applications, such as VoIP calls, latency periods upward of 50-60 ms are unacceptable. Accordingly, there exists a need to reduce the latency period which occurs when the UE is in an active data session.

SUMMARY OF THE INVENTION

An embodiment of the present invention is a method of allocating resources in a packet data system to a User Equipment (UE) with an active data session, such as a Voice over Internet Protocol (VoIP) call, using dedicated resources to transmit scheduling requests, thereby reducing latency which may occur as a result of collisions associated with transmitting scheduling requests over a random access channel. In one embodiment, the method comprises the step of transmitting over dedicated resources a scheduling request, and receiving a scheduling grant in response thereto. The scheduling request indicates that a transmitter in a data session has a data packet to transmit. The scheduling grant indicates resources allocated for transmitting the data packet.

BRIEF DESCRIPTION OF THE DRAWINGS

The features, aspects, and advantages of the present invention will become better understood with regard to the following description, appended claims, and accompanying drawings where:

DETAILED DESCRIPTION

Figure 2:
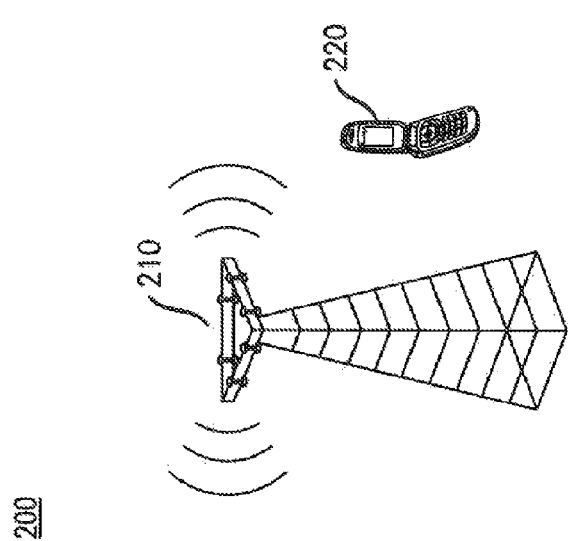
FIG. 2 depicts a wireless communication system used in accordance with one embodiment of the present invention.

For purposes of illustration, the present invention will be described herein with reference to FIG. 2, which depicts a wireless communication system 200 with a packet data system incorporated therein. Wireless communication system comprises a Node B 210 and a UE 220. The packet data system utilizes an Orthogonal Frequency Division Multiple Access (OFDMA) air interface for transmitting data packets between Node B 210 and UE 220, for example, as described in the well-known Universal Mobile Telecommunication System (UMTS) standard specification. The OFDMA comprises a set of forward link and reverse link resources. Such resources are managed by a scheduler at Node B 210.

The reverse link resources may be dedicated resources or shared resources. For purposes of this application, the term "dedicated resources" should be construed to mean resources which are dedicated to a particular UE for use during an entire data session of that UE, such as a Voice Over Internet Protocol (VoIP) call, and the term "shared resources" should be construed to mean resources which are not dedicated resources, i.e., the resources may be used by multiple UEs during a data session.

Figure 1:
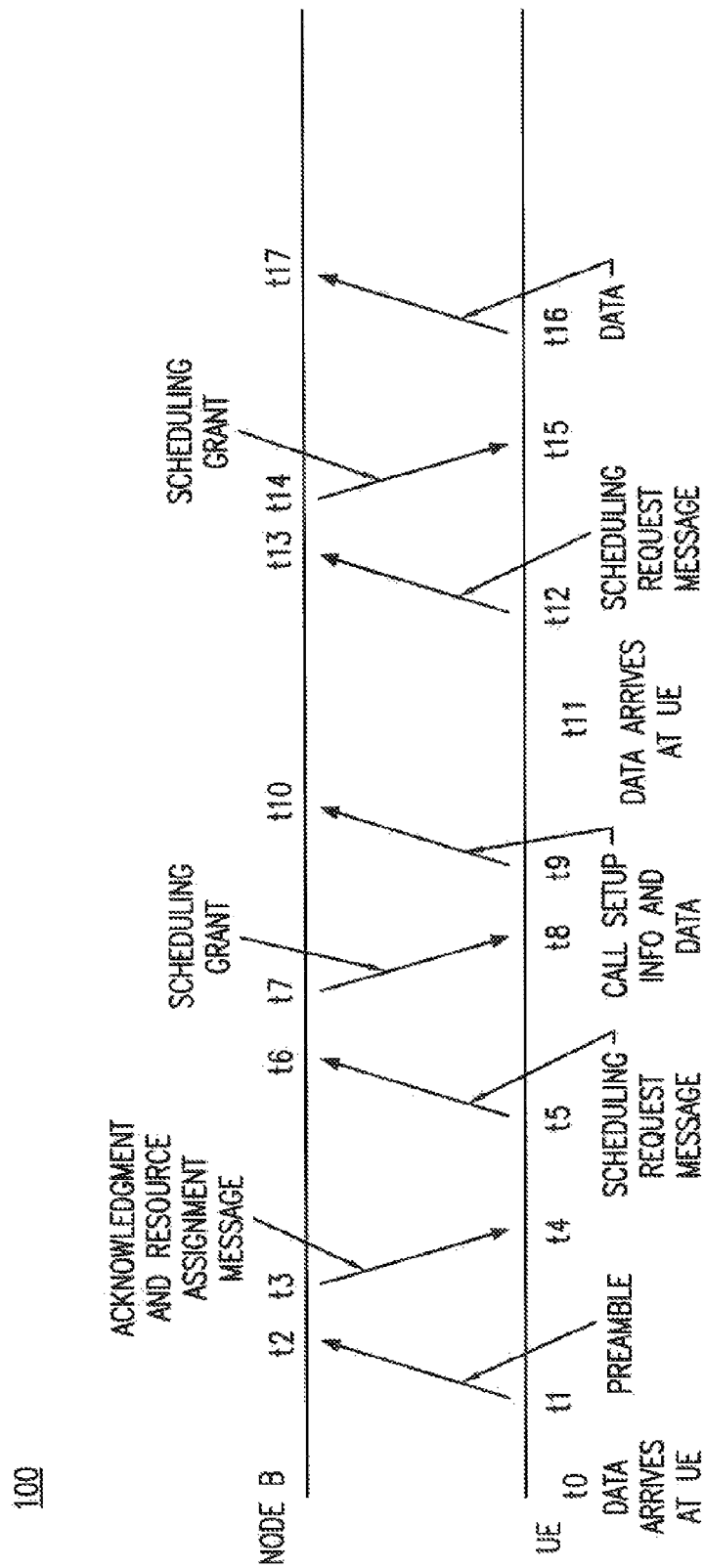
FIG. 1 depicts a chart illustrating a method of allocating reverse link resources to a UE for packet data transmissions in accordance with the prior art.
Figure 3:
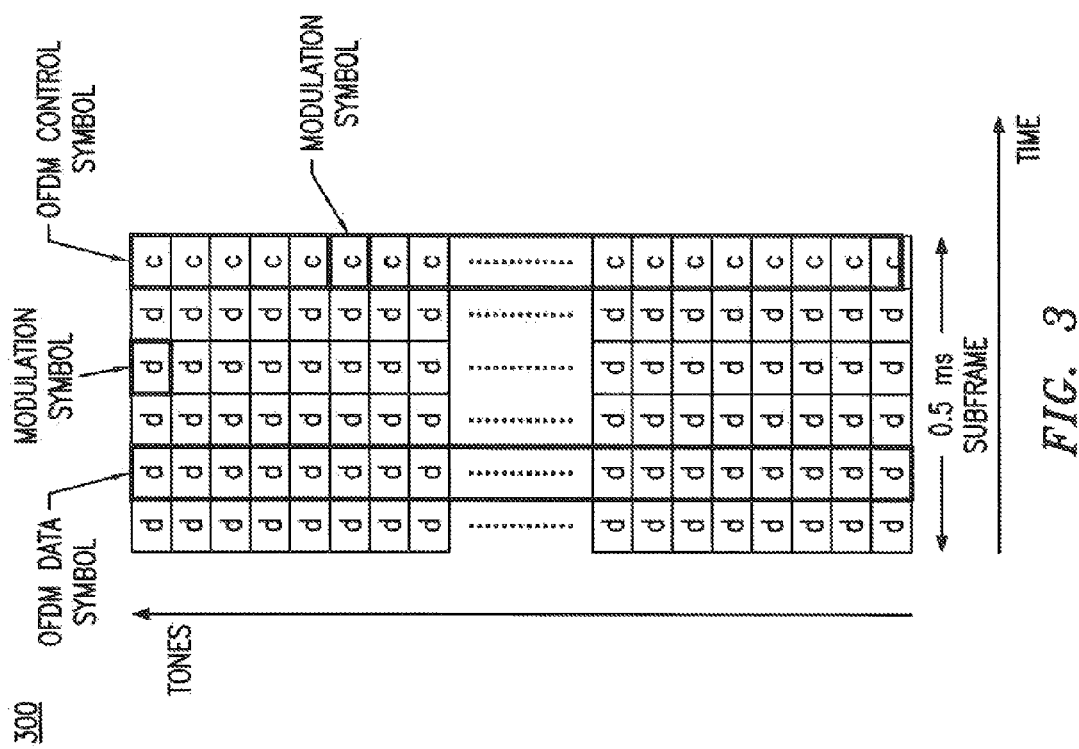
FIG. 3 depicts a subframe used in accordance with one embodiment to the present invention.

The reverse link resources comprise three hundred (or some other number of) sub-carrier frequencies or tones. The sub-carrier frequencies are partitioned in terms of time into 0.5 ms subframes. FIG. 3 depicts a subframe 300 used in accordance with one embodiment to the present invention. Each subframe 300 may comprise six OFDM symbols. The six OFDM symbols include five OFDM data symbols and one OFDM control symbol, wherein the OFDM data symbols are used to represent data and the OFDM control symbol is used to represent control information. Each OFDM symbol can include up to three hundred modulation symbols (corresponding to the three hundred sub-carrier frequencies or tones). If Quadrature Phase Shift Keying (QPSK) is used as a modulation scheme for wireless communication system 200, then each modulation symbol can represent two bits. Thus, up to three thousand data bits may be communicated by a 0.5 ms subframe, i.e., 5 OFDM data symbols/subframe×300 modulation symbols/OFDM symbol×2 data bits/modulation symbol.

In accordance with an embodiment of the present invention, UEs with active data sessions, such as a VoIP call, will use dedicated resources to transmit scheduling request messages (SRM) or some derivative thereof, wherein the SRM or its derivative may be any resource request which includes information about data to be transmitted by UE 220 such that resources may be properly allocated by Node B 210. Using dedicated resources for the transmission of the SRM or derivative thereof (by UEs with active data sessions) removes any delays which may be attributable to collisions of SRM transmissions over a Random Access Channel (RACH), thereby reducing latency between a time when data arrives at the UE with the active data session and a time when such data is transmitted by the UE.

In a first embodiment, dedicated resources are allocated solely for transmission of the SRM or derivative thereof. For example, resources corresponding to a subframe, or part thereof, may be reserved every X ms, e.g., 10 ms, for use by UEs with active data sessions, where X is greater then the time interval associated with the subframe, e.g., 0.5 ms. These reserved resources are partitioned in terms of frequency and/or time into dedicated resources which could then be allocated to specific UEs for transmissions of SRMs or derivative thereof.

In a second embodiment, the SRMs or derivative thereof can be transmitted over dedicated resources used to transmit other types of information. For example, in UMTS, dedicated resources may be allocated for a Reverse Channel Quality Indicator CHannel (R-CQICH) over which a Channel Quality Indicator (CQI) is transmitted. The SRM or derivative thereof may be combined with the CQI and transmitted over the R-CQICH. The SRM or derivative thereof may be combined with the CQI by adding, e.g., appending or prepending, the SRM or derivative thereof to the CQI. Or the SRM or derivative thereof may be combined with the CQI by substituting a part the CQI with the SRM. After the SRM or derivative thereof has been combined with the CQI, for example, the combination may be encoded or otherwise processed prior to being transmitted over the dedicated resources.

Figure 4:
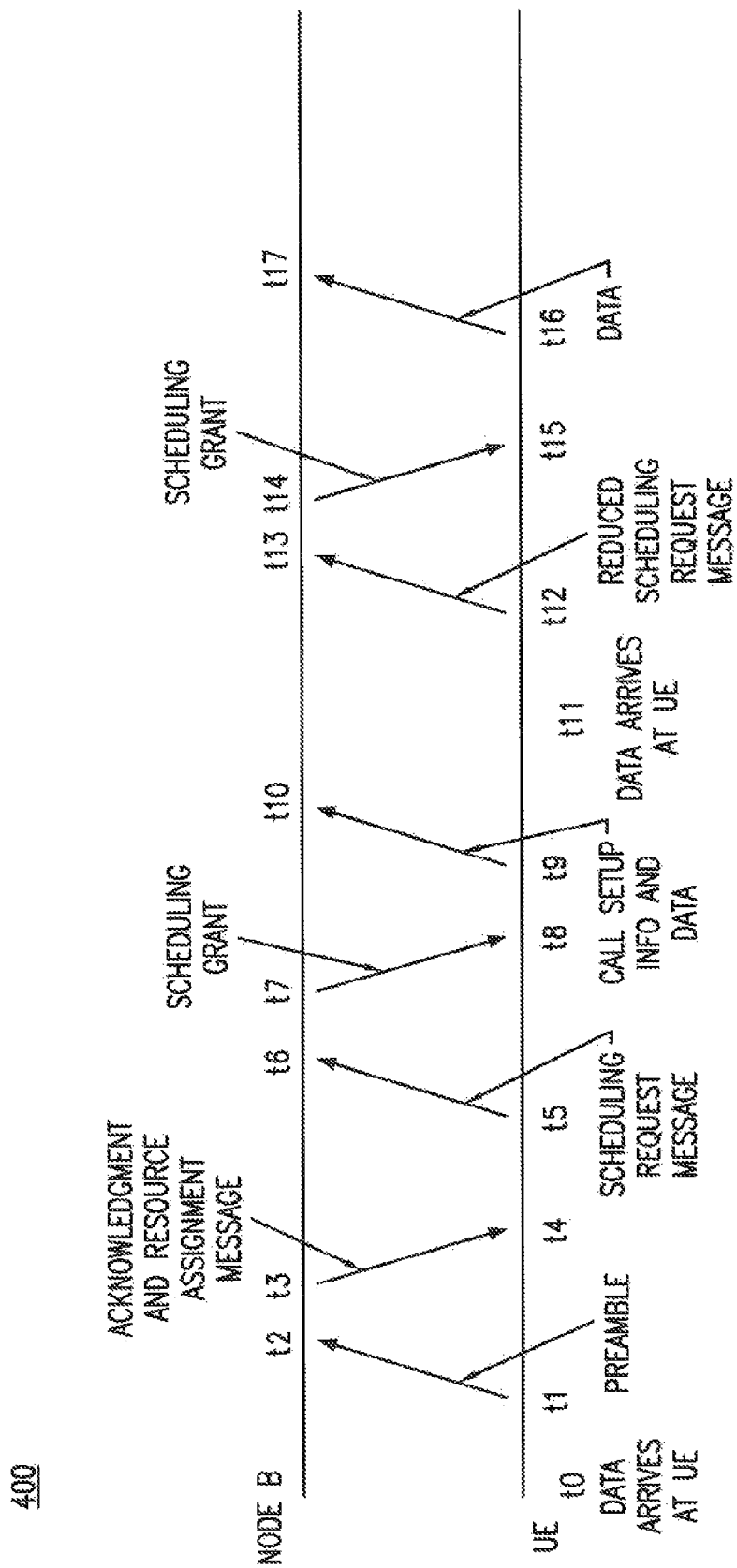
FIG. 4 depicts a chart illustrating a method of allocating dedicated resources to a User Equipment with an active data session in accordance with one embodiment of the present invention.

FIG. 4 depicts a chart 400 illustrating a method of allocating dedicated resources to a UE with an active VoIP call (or some other data session) in accordance with one embodiment of the present invention. In this embodiment, each UE with an active VoIP call is allocated dedicated resources for the transmission of a reduced scheduling request message (R-SRM), which is a derivative of the SRM, as will be described herein.

At time t0, UE 220 is in an idle state when data arrives in its buffer. For a VoIP call, the data would include VoIP call setup signaling messages and zero or more speech packets. For another type of data session, the data would include call setup information and zero or more data packets At time t1, UE 220 transmits a preamble to Node B 210 over a non-synchronized Random Access CHannel (RACH) or some other access channel, wherein the non-synchronized RACH is non-synchronized in the sense that it is not time synchronized with the Node B. The preamble indicates to Node B 210 that UE 220 needs resources in order to transmit the data in its buffer. The preamble is selected from a set of preambles having low cross correlation with one another, and is transmitted over the non-synchronized RACH in accordance with a contention based random access scheme.

At time t2, Node B 210 detects the preamble and allocates resources to UE 220 for transmitting a scheduling request message (SRM). In one embodiment, the SRM may indicate information regarding an amount of data, a data type and/or a priority. At time t3, Node B 210 transmits to UE 220 an acknowledgement and a resource assignment message over an Acquisition Indicator CHannel (AICH) or some other control channel. The acknowledgement indicates that the preamble was received and the identity of the preamble that was received (which can be used by the UE to determine the intended recipient of the acknowledgement). The resource assignment message indicates the shared resources allocated to UE 220 for sending the SRM.

At time t4, UE 220 receives the acknowledgement and resource assignment message. UE 220 selects a SRM from a set of SRMs. The set of SRMs include subsets of (one or more) SRMs, wherein each subset is associated with different categories of data. For example, one subset might indicate 400 bits of speech, whereas another subset might indicate 600 bits of video. Each SRM is a signature sequence having low cross correlation with other SRMs. The SRM (or subset) is selected based on which category the data matches. At time t5, UE 220 transmits the selected SRM using the allocated shared resources indicated in the resource assignment message.

At time t6, Node B 210 receives the SRM and allocates resources to UE 220 based on the category of the received SRM. Both shared and dedicated resources are allocated for the transmission of the data and R-SRM, respectively, wherein the allocated shared resources should be sufficient for the transmission of the data. At time t7, Node B 210 transmits over a control channel, such as a grant channel, a scheduling grant indicating the allocated resources and the UE to which the resources are being allocated.

At time t8, UE 220 receives the scheduling grant which allows UE 220 to enter an active state in which the VoIP call (or data session) is activated. At time t9, UE 220 uses the allocated shared resources to transmit its data which, for a VoIP call, would include the VoIP call setup signaling messages. At time t10, Node B 210 receives the data.

Note that data sessions would typically be terminated after some time interval of inactivity. VoIP calls, which is a type of data session, need to remain active for quality purposes even if no data e.g., speech packet, is being transmitted for an extended time interval. In one embodiment, in order to keep a VoIP call active (after transmitting the data at time t10), UE 220 may periodically, e.g., 160 ms, transmit a Silence Descriptor (SID) over allocated shared resources. The shared resources may be allocated in response to a SRM (or derivative thereof) transmitted by UE 220. Or Node B 210 may periodically allocate resources to UE 220 for transmission of the SID in the absence of a SRM.

While the VoIP call (or data session) is still active, UE 220 receives more data, such as speech packets, in its buffer at time t11. At time t12, UE 220 transmits over the allocated dedicated resources (as indicated in the scheduling grant) a reduced SRM (R-SRM). In one embodiment, the R-SRM is a request which indicates that the UE has data to transmit. The R-SRM may also indicate any change to information which was earlier indicated by a SRM (or derivative thereof) or the VoIP call setup signaling messages (or other call setup information). Most information that was earlier indicated in a SRM or VoIP call setup signaling messages (or other call setup information), such as priority of user data and size of speech packet, is static for the data session. Thus, it is not necessary for UE 220 to retransmit the static information since Node B 210 already has it. For example, suppose UE 220 is in a VoIP call. VoIP call setup signaling messages provided by UE 220 at time t9 should indicate a type of vocoder being used by UE 220. The vocoder type should indicate to Node B 210 that UE 220 will be transmitting a certain size speech packets during the VoIP call, e.g., an Adaptive Multiple Rate (AMR) vocoder will generate 20 ms speech packet during the VoIP call. Thus, information about the type of data and amount of data need not be communicated from UE 220 to Node B 210 later during the same data session.

In one embodiment, the R-SRM may be a one bit message (or flag) indicating UE 220 has data to transmit. To enhance detection at Node B 210, the R-SRM may be repeated 9 times for a total of 10 data bits. If wireless communication system 200 is configured with a 0.5 ms subframe for use as dedicated resources for transmitting this one bit R-SRM (and the 0.5 ms subframe can convey up to three thousand data bits using QPSK, i.e., configuration described earlier with respect to FIG. 3), then up to three hundred UEs with active data sessions, i.e., 3000 data bits/subframe÷10 data bits/UE, can be supported with dedicated resources for the transmission of R-SRMs. In other embodiments, the R-SRM may be a message comprising several bits for indicating an amount of data, type of data, priority of the data and/or a maximum transmit power associated with UE 220.

In one embodiment, UE 220 may have discretion on whether to send the R-SRM over the dedicated resources or to send a SRM over the synchronized RACH depending on, for example, a data type or priority associated with the data. The dedicated resources might only be used to send the R-SRM if the data is time sensitive or high priority. If the data is low priority or not time sensitive, UE 220 may send the SRM over the synchronized RACH (or other communication channel).

In the latter case, dedicated resources do not have to be allocated to the associated UE.

The R-SRM is received by Node B 210 at time t13. Node B 210 allocates shared resources to UE 220 for transmission of its data based, in part or whole, on the R-SRM. At time t14, Node B 210 transmits a scheduling grant over a control channel, such as a grant channel, indicating the allocated shared resources. UE 220 receives the scheduling grant at time t15 and transmits its data at time t16 using the allocated shared resources. At time t17, Node B 210 receives the data.

If more data subsequently arrives at UE 220 while the VoIP call (or data session) is active, shared resources will continue to be allocated to UE 220 in accordance with the procedures described earlier with respect to times t11 to t15. If the VoIP call (or data session) is terminated, the allocated dedicated resources (for transmitting the R-SRM) are released by UE 220 and can be reallocated to other UEs.

Although the present invention has been described in considerable detail with reference to certain embodiments, other versions are possible. Therefore, the spirit and scope of the present invention should not be limited to the description of the embodiments contained herein.

The invention claimed is:

1. A method of allocating resources in a packet data system comprising the steps of:
   transmitting at least a first scheduling request over selected resources; and
   receiving a scheduling grant in response to at least the first scheduling request, wherein the scheduling grant indicates resources allocated to a transmitter for use in transmitting a data packet, and wherein the resources are selected to be dedicated resources for time-sensitive data packets and shared resources for non-time-sensitive data packets.

2. The method of claim 1 comprising the additional step of:
   prior to the step of transmitting the first scheduling request, receiving another scheduling grant indicating allocation of the dedicated resources.

3. The method of claim 1, wherein the shared resources is a random access channel.

4. The method of claim 1, comprising a further step of transmitting a second scheduling request, and wherein the first and second scheduling requests are not the same.

5. A method of allocating resources in a packet data system comprising the steps of:
   receiving at least a first scheduling request over selected resources; and
   transmitting a scheduling grant in response to at least the first scheduling request, wherein the scheduling grant indicates resources allocated to a transmitter for use in transmitting a data packet, and wherein the resources are selected to be dedicated resources for time-sensitive data packets and shared resources for non-time-sensitive data packets.

6. The method of claim 5 comprising the additional step of:
   prior to the step of receiving the first scheduling request, transmitting another scheduling grant indicating allocation of the dedicated resources.

7. The method of claim 5, wherein the shared resources is a random access channel.

8. The method of claim 5, comprising a further step of receiving a second scheduling request, wherein the first and second scheduling requests are not the same.

* * * * *